United States Patent
Vasko

(10) Patent No.: US 6,463,339 B1
(45) Date of Patent: Oct. 8, 2002

(54) HIGH RELIABILITY INDUSTRIAL CONTROLLER USING TANDEM INDEPENDENT PROGRAMMABLE GATE-ARRAYS

(75) Inventor: David A. Vasko, Macedonia, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/406,654

(22) Filed: Sep. 27, 1999

(51) Int. Cl.[7] .............................................. G05B 11/01
(52) U.S. Cl. ................. 700/18; 700/2; 700/5; 700/19; 700/21; 700/79; 700/86; 719/1; 719/2; 719/741; 719/742; 719/750
(58) Field of Search ............................. 700/2, 3, 5, 18, 700/19–21, 79, 86, 87, 88, 89; 714/1–2, 750, 741–742

(56) References Cited

U.S. PATENT DOCUMENTS

| | | | | |
|---|---|---|---|---|
| 4,153,942 A | * | 5/1979 | Gregory | 712/223 |
| 4,212,076 A | * | 7/1980 | Conners | 708/130 |
| 5,963,448 A | * | 10/1999 | Flood et al. | 700/19 |
| 6,073,053 A | * | 6/2000 | Dummermuth | 700/2 |
| 6,173,208 B1 | * | 1/2001 | Park et al. | 700/18 |
| 6,185,477 B1 | * | 2/2001 | Palm et al. | 700/18 |
| 6,249,711 B1 | * | 6/2001 | Aart | 700/11 |
| 6,381,502 B1 | * | 4/2002 | Rudder et al. | 700/17 |

OTHER PUBLICATIONS

A. Osborne & J.D. Myers, "a Methodical Approach to Remote IP Stack Identification," Network Associates, Inc., Santa Clara, California (1999).

Fydor, "Remote OS detection via TCP/IP Stack Fingerprinting," http://www.insecure.org/nmap/nmap–fingerpringting–article.html (Apr. 1999).

* cited by examiner

Primary Examiner—Ramesh Patel
(74) Attorney, Agent, or Firm—Keith M. Baxter; Alexander M. Gerasimow; William R. Walbrun

(57) ABSTRACT

A highly reliable industrial controller uses low complexity field programmable gate-arrays (FPGA) in lieu of standard microprocessors where each FPGA is programmed so as to provide for a different internal implementation of the control program as a set of interconnected logical gates. Variations in the outputs of the FPGAs caused by hardware failure may be corrected by choosing the most common output, a default output or a default value. Errors may be detected though conventional hardware error detection methods or by a direct comparison of the outputs which under normal conditions should match each other.

21 Claims, 7 Drawing Sheets

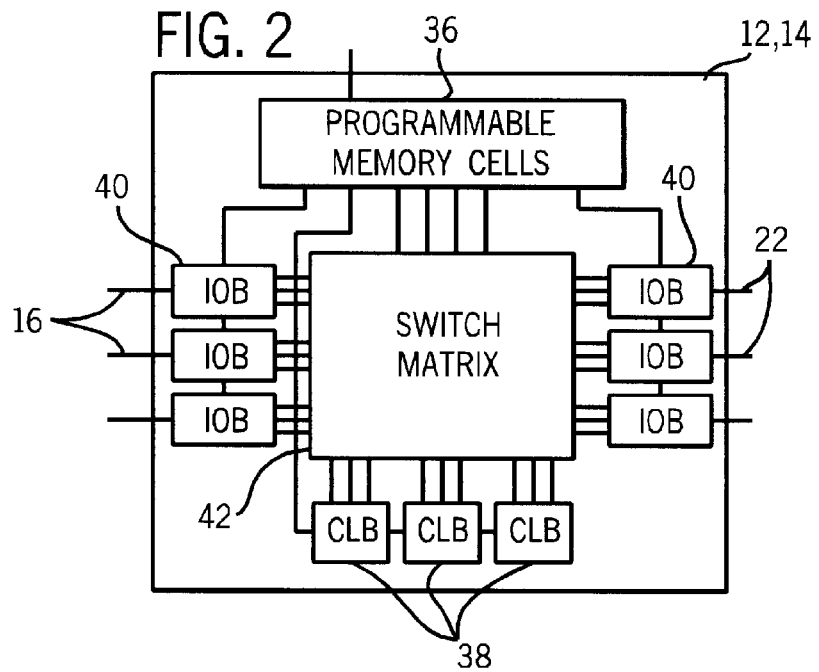
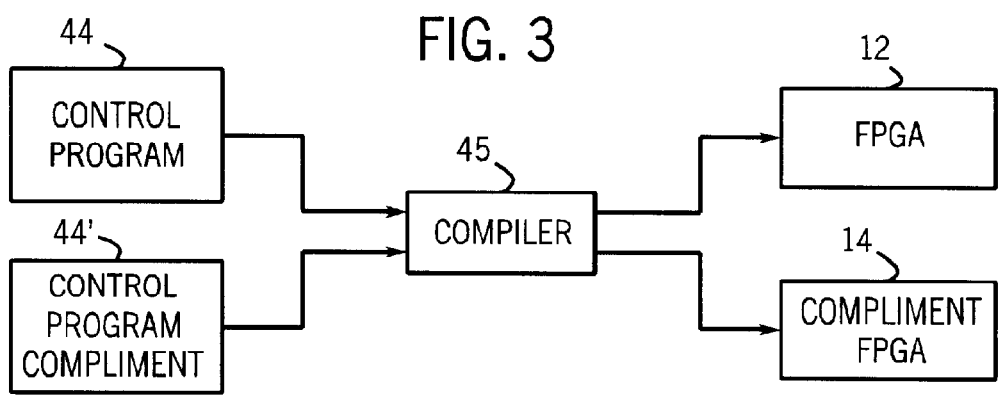
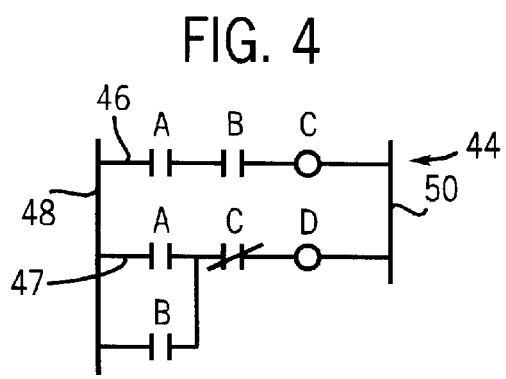

HIGH RELIABILITY INDUSTRIAL CONTROLLER USING TANDEM INDEPENDENT PROGRAMMABLE GATE-ARRAYS

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to industrial controllers and in particular to high reliability industrial controllers such as may be used to implement safety interlocks or other critical control functions.

Industrial controllers are special purpose computers used for controlling industrial processes or manufacturing equipment. Under the direction of a stored program, the industrial controller examines a series of inputs reflecting the status of the controlled process, and changes a series of outputs controlling the industrial process. The inputs and outputs may be binary, that is on or off, or analog providing a value within a continuous range. Typically analog signals are converted to binary words for processing.

A typical industrial controller includes a microprocessor sequentially executing instructions of a control program stored in electronic memory to read and write control values to an input/output (I/O) table. The I/O table is scanned independently of execution of the control program to communicate the control values as electrical control signals between the I/O table and the controlled equipment. The basic functions of the microprocessor in executing the control program and scanning the I/O table are performed by an operating system (OS) program.

Industrial controllers may be programmed in a "relay ladder language" logic in which instructions are represented graphically by rungs composed of "normally-open" or "normally-closed" contacts connected in series or parallel to "coils" of relays. The contacts represent inputs from the controlled process and the coils represent outputs to the controlled process. This graphical language mirrors early industrial control systems which used actual relays to provide the control logic needed to control machinery or a factory.

The rungs are arranged in parallel across power lines suggesting the parallel operation of such a relay assembly. Execution of the rungs on the industrial controller, however, is performed sequentially, each rung is evaluated one at a time. By performing the sequential scanning and execution of the rungs at high speed, parallel execution of the rungs is simulated.

Industrial controllers differ from conventional computers in that industrial controllers normally control the real-time operation of machinery often in the manufacture of a product. Momentary interruption of the industrial controller can cause damage to equipment or loss of product. In some critical applications, such as the operation or monitoring of safety equipment, failure of an industrial controller can create a risk of injury to humans. It is desirable that industrial controllers be extremely reliable, that they fail in a safe mode, and that their failure be immediately detectable.

One approach to increasing the reliability of an industrial controller is to use a redundant primary and secondary industrial controller. Failure of the primary controller causes a switch over to the secondary controller which assumes the primary controller's control responsibilities. Such systems are described in U.S. Pat. No. 4,521,871, 5,313,386, and 5,777,874 assigned to the assignee of the present invention and incorporated herein by reference. The switch over between two industrial controllers is performed by special modules within the industrial controllers which monitor hardware or software generated error signals to determine that a switch over is required. Detecting the errors and the switch over process itself can introduce delay in restoring control.

A more general approach to increasing the reliability of an industrial controller which does not require the production or monitoring of error signals (which may also fail) uses multiple industrial controllers operating at the same time. The outputs provided by each industrial controller are compared and only if the outputs are the same are they transmitted to the controlled process. Critical to the effectiveness of this system is the ability to detect and take appropriate actions at run time not only for individual hardware failures but for systemic failures that might have been introduced inadvertently during the design phase. The key to detecting these systemic failures is to ensure that the industrial controllers, if they fail, fail at different times or in different ways so that a difference in their outputs will occur. For this reason, it may be desired to use different industrial controller components and in particular different programs, algorithms, operating systems, development tools, development environments and developers. This later requirement significantly increases the cost of this approach.

When an industrial controller is used for the control of certain safety systems, such as in implementing machine stop commands, fast control response times are necessary. The faster the response from the input (the pressing of an emergency stop button, the breaking of a light curtain or the like) to the output response (the stopping of the machine) the greater the safety margin. For large or complex control programs, such fast response times require powerful processors which are extremely complex and use many millions of transistors. Because a failure of even one transistor in these processors may cause a failure of the entire processor, the complexity of these microprocessors raises its own reliability problems.

BRIEF SUMMARY OF THE INVENTION

The present invention provides a highly reliability industrial controller providing not only higher execution speed and greater predictability of operation but lower cost.

A key to the present invention is replacing microprocessors and their operating systems with programmable gate-arrays. The gate-arrays execute the control program directly as interconnected logic gates in a manner analogous to that of original relay ladders used in industrial control, but of course, at far greater speed. The number of gates in the gate-array may be several orders of magnitude fewer than the number of gates in a typical microprocessor, thereby improving reliability and because of the parallel nature of execution the operation of a gate-array, can be much faster than the operation of a microprocessor. Operating systems and the reliability problems they introduce are eliminated.

In the invention, multiple gate-arrays are programmed to provide the same global control logic (executing the control program) but to implement that control logic in different ways so as to increase the probability of any failure being reflected in different ways in different gate-arrays. Outputs of the multiple gate-arrays are then compared to detect errors and increase reliability. Errors may alternatively be detected independently of the outputs. Variations in the implementation of the control logic may be provided by using gate-arrays with different internal architectures (for example from different vendors) or by modifying the control program or the compiling process itself.

Specifically the present invention provides a high reliability industrial controller for control of an industrial process according to a control program where the controller includes at least two programmable gate-arrays having logic gates interconnected according to programmable memory cells. The programmable gate-arrays have gate-array inputs received by the interconnected logic gates which in turn provide gate-array outputs that are Boolean functions of the gate-array inputs. The programmable memory cells of the first and second programmable gate-arrays are programmed to each independently execute a control program using different interconnections between logic gates. Input circuitry accepts electric inputs from the industrial process and routes the inputs to the gate-arrays of both the first and second programmable gate-arrays. Comparison circuitry receives gate-array outputs from each of the first and second programmable gate-arrays to produce controller outputs dependent on whether corresponding outputs of the first and second programmable gate-array have matching values. Output circuitry receives the controller outputs and connects them to the industrial process.

Thus, it is one object of the invention to provide fundamentally more reliable industrial control than can be achieved by current generations of microprocessors. Errors can be detected through the use of redundant but different hardware systems simply by observing the outputs. The use of different interconnections in the programmable gate-arrays increases the likelihood that a single component failure will produce different outputs in the different implementations of the gate-array.

It is another object of the invention to significantly increase the reliability of industrial controllers by decreasing device complexity. A typical gate-array include one-hundred times fewer gates than a standard microprocessor.

As mentioned, the different interconnections between logic gates may be realized either through use of programmable gate-arrays having fundamentally different architectures, for example from different vendors, or through a manipulation of the implementation of the control program such as produces different interconnections in the logic gates. For example programming one programmable gate-array in inverted logic.

Thus it is another object of the invention to provide some simple mechanisms to reduce the occurrence of systematic failures among gate-arrays which might not be detected.

The outputs of the gate-arrays may be compared and forwarded to the industrial process only if they are logically the same, i.e., either the same logic state or opposite logic states when one programmable gate-array is programmed with inverted logic.

Otherwise one gate-array output may be used or a default output value may be used.

Thus, it is another object of the invention to provide an industrial controller that is "fail safe" by providing a default "safe" state output unless the proper output can be unambiguously determined. In a typical embodiment, only if both gate-arrays provide a logical true output will a logical true signal be forwarded to the industrial process. Otherwise, a logical false output will be used.

The outputs from the gate-arrays may be compared to each other and an error signal produced if they do not match.

Thus it is another object of the invention to provide an indication of failure separate from the actual output from the industrial controller. In this way the need for corrective action may be signaled or (in certain situations) the controlled process shut down completely.

More than two programmable gate-arrays may be used in which case the outputs are compared and only the majority output is provided to the controlled process.

Thus it is another object of the invention to provide an industrial controller that has a high reliability of correct operation even when one or more programmable gate-arrays has failed and yet which provides a positive indication of that failure so that corrective action may be taken.

The control program may program the programmable memory cells through the use of a compiler and the programmable memory cells of the first and second programmable gate-arrays may use different compilers.

Thus it is another object of the invention to provide variation between the hardware implementation of the industrial control on otherwise identical gate-arrays through the use of different compilers.

In an alternative embodiment, the error signal may be derived independently of the outputs of the gate-arrays, for example, though the use of a watch dog timer circuit or the like. The error signal may be used to trigger use of the majority output signal from the gate-arrays, an output signal from a pre-selected gate-array, or a default value for the controller output.

Thus it is another object of the invention to allow the detection of error conditions that might not be apparent from the outputs of the gate-arrays alone.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 2 is a block diagram of an example commercially available programmable gate-array showing component configurable logic blocks and input output blocks flexibly interconnected by a switch matrix controlled by programmable memory cells;

FIG. 3 is a flowchart showing compilation of a control program and a complementary control program by a single compiler to produce the different field programmable gate-arrays of FIG. 1;

FIG. 4 is an example relay ladder logic control program such as may be used in the present invention;

FIG. 15. is a block diagram showing application of the present invention to an industrial controller having. input and output circuits separated by a network or the like.

DETAILED DESCRIPTION OF THE INVENTION

Figure 1:
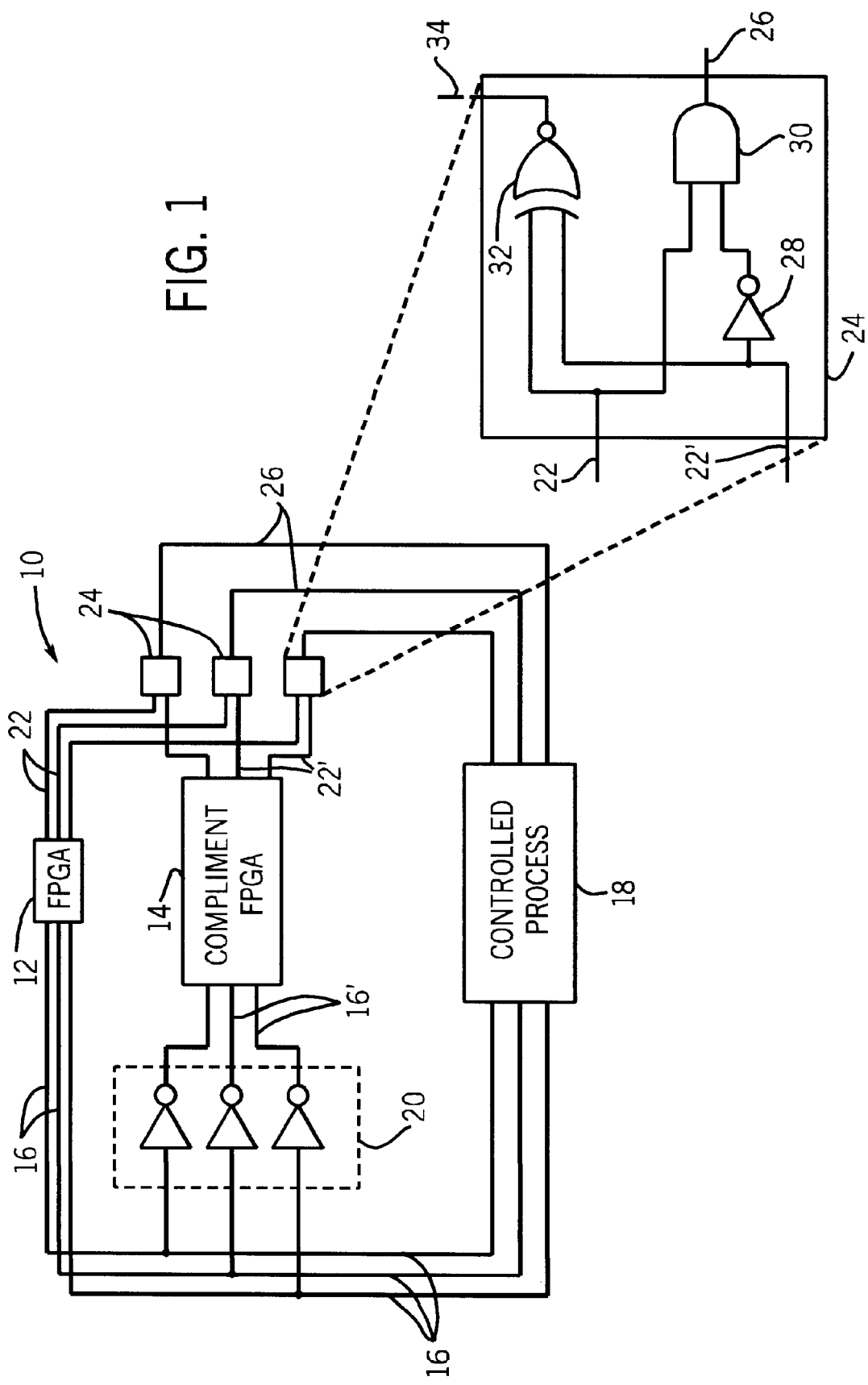
FIG. 1 is a block diagram showing one embodiment of the present invention using two field programmable gate-arrays, one programmed with complementary logic, receiving inputs from a controlled process to provide independent outputs to a comparison circuit which provides outputs to the controlled process.

Referring now to FIG. 1, an industrial controller 10 constructed according to the present invention employs a first and second field programmable gate-arrays (FPGA) 12 and 14, respectively. Each FPGA 12 and 14 receives gate-array inputs 16 from a controlled process 18, however, the FPGA 12 receives the inputs directly from the controlled process 18 while the FPGA 14 receiving the inputs only after they have been inverted to inverted gate-array inputs 16' by inverter bank 20.

As will be described in more detail below, each FPGA 12 and 14 consists of interconnected Boolean logical gates such as: AND-gates, OR-gates, exclusive OR-gates, inverters, and combinations thereof. The FPGA 12 is programmed to interconnect its logical gates to provide non-complementary gate-array outputs 22 from gate-array inputs 16 according to a pre-defined control program for controlling the controlled process 18. In contrast the FPGA 14 is programmed to interconnect its logical gates to provide complementary gate-array outputs 22' from inverted gate-array inputs 16'. For normal operation of the controller 10 the complementary gate-array outputs 22' of the FPGA 14 will be exactly the inverse of the corresponding non-complementary outputs from the FPGA 12.

Gate-array outputs 22 and 22' are received by comparison circuits 24, each of which receives a pair of corresponding gate-array outputs 22 and complementary gate-array output 22'. The comparison circuits 24 may be implemented as part of the FPGAs 12. As mentioned, correct operation of the industrial controller 10 is indicated when each of the pairs of gate-array outputs 22 and 22' received by a given comparison circuit 24 are logic inverses. The internal structure of the comparison circuits 24 reflects this logic by receiving the gate-array outputs 22 and 22' and providing a controller output 26 that is logically true only if gate-array output 22 is logically true and complementary gate-array outputs 22' is logically false.

A simple embodiment of the comparison circuit 24 inverts complementary gate-array outputs 22' with inverter 28; then combines gate-array outputs 22 and inverted complementary gate-array outputs 22' via dual-input AND-gate 30 whose output forms controller output 26.

As will be understood, so long as gate-array outputs 22 and 22' are the inversions of each other, controller output 26 equals gate-array outputs 22. However, if complementary gate-array outputs 22 and 22' are the same, indicating a failure of one of the FPGAs 12 or 14 and hence of the industrial controller 10, and controller output 26 remains logically false. Provided that highly critical inputs to the controlled process 18 are assigned to logically true values, they will not be activated in the event of a failure of the industrial controller 10.

Comparison circuits 24 also include an error generating circuit providing an error signal 34 that may electively be used to cease the control operation entirely or to allow the control operation to continue with scheduled immediate maintenance. The error generating circuit, in this case, may be simply a dual-input exclusive OR-gate 32 which directly receives gate-array outputs 22 and complementary gate-array outputs 22'. This error signal 34 may be ORed with similar error signals from the other comparison circuits 24 or used individually.

Referring now to FIG. 2, FPGAs 12 and 14 are readily available from a number of commercial vendors including the Xilinx Corporation of San Jose, Calif. Such FPGAs 12 and 14 differ from microprocessors in that they do not sequentially decode instructions according to a clock to read and write from memory but instead are more accurately described as hardware interconnected logical gates that differ from wired together discrete logical gates only by the fact that the interconnections are affected by a reprogrammable set of memory cells 36. Central to the FPGAs 12 and 14 are a number of configurable logic blocks 38 which, depending on the particular architecture, may be individual logic gates such as AND or OR-gates (in "fine grained" architectures) to many pre-connected logical gates (in "coarse grained" architectures).

The configurable logic blocks 38 are attached selectively to I/O blocks 40 which may receive gate-array inputs 16 and convey them to the configurable logic blocks 38 or provide a path from the configurable logic blocks to the gate-array outputs 22.

The interconnections between I/O blocks 40 and the configurable logic blocks 38 are provided by a switch matrix 42 whose settings are controlled by the programmable memory cells 36 programmed by a user. Thus, by programming the programmable memory cells 36, a set of logic gates are effectively wired together. The programmable memory cells 36 may also change certain configurations in the I/O blocks 40 and the configurable logic blocks 38 activating inverters and changing the characteristics of the gates, for example.

Referring now to FIGS. 3 and 4, the programmable memory cells 36 of FIG. 2 may be programmed by a user according to a control program 44. As shown in FIG. 4, an example control program 44 may accept two inputs A and B to provide an output D. Per the convention of relay ladder logic, the inputs A and B are represented by normally-open contacts and the output D by a coil symbol. A first rung 46 connected from a first power rail 48 to a second power rail 50 includes series connected contacts A and B connected with a dummy coil C. A next rung 47 provides for the parallel connection of contacts A and B from power rail 48 to a junction connected with a normally-closed contact controlled by coil C. The uncommitted lead from normally-closed contact C proceeds through coil D to rail 50.

The depiction reflects a wiring of actual relays that would provide the desired control logic of energizing coil D (a logical true output) when either of contacts A and B are closed (true) but not when both contacts A and B are closed. The truth table for this simple program is given in the following Table I where per convention 0 represents a logically false state and I represents a logically true state:

TABLE I

| A | B | D |
|---|---|---|
| 0 | 0 | 0 |
| 0 | 1 | 1 |
| 1 | 0 | 1 |
| 1 | 1 | 0 |

Figure 5:
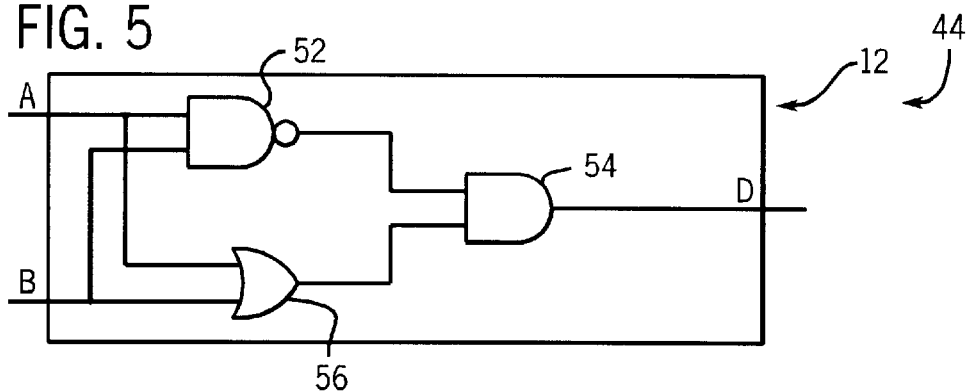
FIG. 5 is a set of interconnected logic gates performing the function of the control program of FIG. 4 as implemented in the first programmable gate-array of FIG. 1.

Referring now to FIG. 5 the program 44 may be compiled to the FPGA 12 either by a compiling program or manually to produce within the FPGA 12 an interconnected dual-input NAND-gate 52, dual-input AND-gate 54 and dual-input OR-gate 56 where inputs A and B are input both to the NAND-gate 52 and OR-gate 56 and the outputs from the NAND-gate 52 and OR-gate 56 are input to the AND-gate 54 the output of which provides output D. The implementation of FIG. 5 represents actual physical interconnection of the gates in the FPGA 12.

Referring now to FIG. 1, in the first embodiment, the second FPGA 14 is programmed so as to provide a complementary execution of the control program 44 which reduces the possibility of an undetectable systematic and common cause errors. Note that in contrast, systemic errors are those errors introduced during the development process. Accordingly, as shown in FIG. 3, first a complementary control program 44' is prepared being simply the inversion of the Table I as shown below in Table II.

TABLE II

| $\overline{A}$ | $\overline{B}$ | $\overline{D}$ |
|---|---|---|
| 1 | 1 | 1 |
| 1 | 0 | 0 |
| 0 | 1 | 0 |
| 0 | 0 | 1 |

Figure 6:
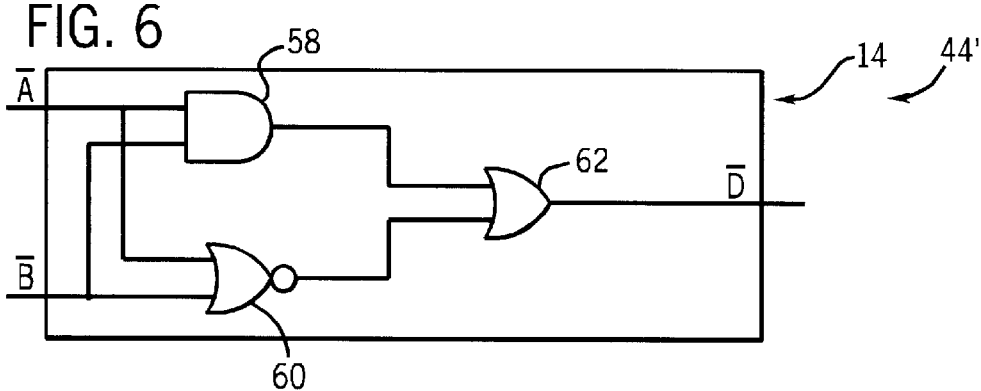
FIG. 6 is a set of interconnected logic gates performing the complementary function of the control program of FIG. 4 as may be implemented in the second complement field programmable gate-array of FIG. 1.

The logic of the complementary program 44' provides for an output D only when inputs A and B are either both one or both zero. This is implemented in the FPGA 14 as shown in FIG. 6 by dual-input AND-gate 58, dual-input NOR-gate 60 and dual-input OR-gate 62 where complimented inputs and (from the inverter bank 20 of FIG. 1) are received by the inputs of the NAND-gate 58 and NOR-gate 60 and the outputs of AND-gate 58 and NOR-gate 60 are provided to the inputs of OR-gate 62 to produce the complementary output. Thus it will be understood therefore for a given set of inputs A and B, complementary inputs to FPGA 12 will produce the complementary output to FPGA 14. It will be understood from this description, that there are many ways of complimenting a control program 44 and that the intent is simply to ensure a predictable output value with a different configuration of logical gates within the FPGA 12 and 14.

As described above and shown in FIG. 1, pairs of mutually complementary gate-array outputs 22 and 22' (and D) are then combined to provide controller output 26 to the controlled process 18 and an error signal 34.

Figure 7:
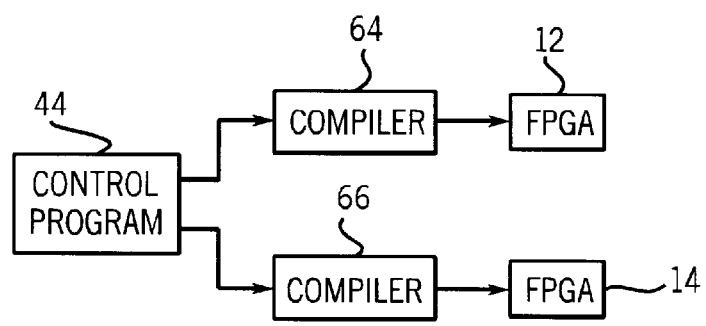
FIG. 7 is a flowchart similar to that of FIG. 3 showing a second embodiment in which a control program is programmed in non-complementary logic implemented by two compilers that produce different internal gate interconnections in two field programmable gate-arrays otherwise having the same architecture.

Referring now to FIG. 7 in a second embodiment, a single control program 44 is compiled by two different compilers 64 and 66 to produce the programming of FPGAs 12 and 14 providing for different internal configurations of the logical gates. In this case, one compiler 66 may invert the control program 44 to produce a complementary control program 44 as described above, so that no new control program need be prepared, or the compiler 66 may simply use a different set of conversion rules from compiler 64 so as to implement a different structure of logical gates within the FPGAs 12 and 14. For example, compiler 64 may implement NAND-gates using a pre-configured NAND-gate whereas compiler 66 may implement NAND-gates using a combination of an AND-gate and inverter. This simple variation provides no fundamental change to the logic but ensures a different implementation of gates in each FPGA 12 and 14 so that any systemic failure in development will likely be manifest in different ways in the gate-array outputs 22.

Figure 8:
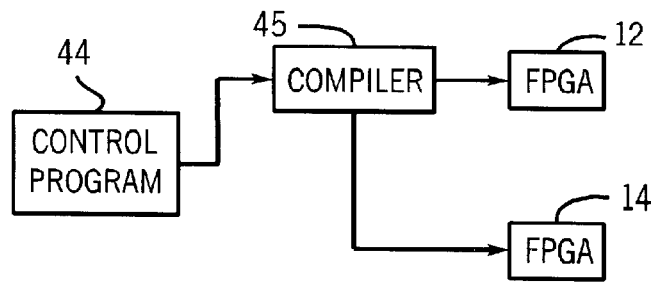
FIG. 8 is a flowchart similar to FIGS. 4 and 8 showing a third embodiment where a control program is compiled by a single compiler into field programmable gate-arrays having different architectures.

Referring to FIG. 8 in yet another embodiment, a single control program 44 may be compiled by a single compiler 45 into two FPGAs 12 and 14 manufactured by different vendors with different internal architectures. This embodiment requires a compiler that allows the porting of an individual control program 44 to different types of gate-arrays. Such compilers exist for given manufacturers between different architectures. In all these cases the key is to provide for a different internal configuration of gates within the FPGAs 12 and 14.

Figure 9:
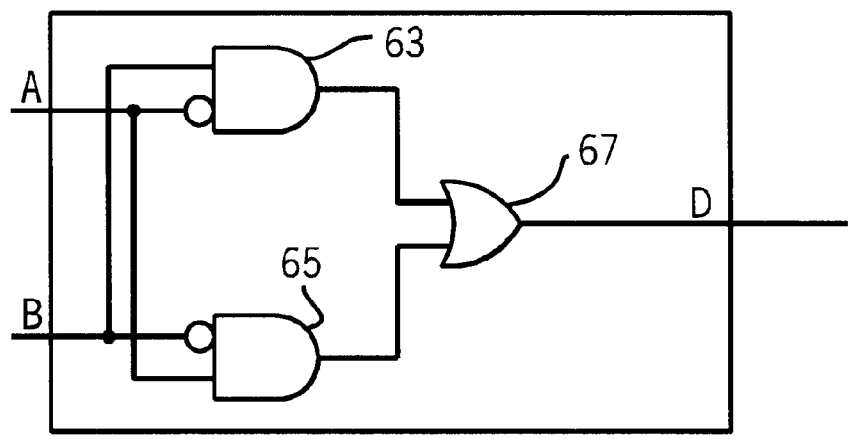
FIG. 9 is a figure similar to FIG. 5 showing an alternative gate interconnection such as may provide the function of the control program of FIG. 4 per the method of FIGS. 8 or 9.

Referring now to FIG. 9, a different but non-complementary implementation of the control program of FIG. 4 is provided by FPGA 14 through dual AND-gates 63 and 65 (each having on inverted input) and dual-input OR-gate 67 where inputs A and B are received by each of the inputs of the AND-gates 63 and 65 and their outputs are provided to the inputs of OR-gate 67 to produce the output D. Thus it will be understood therefore for a given set of inputs A and B, FPGA 14 will produce the same output to FPGA 12 (per FIG. 5) but using a different set of internal connections.

Figure 10:
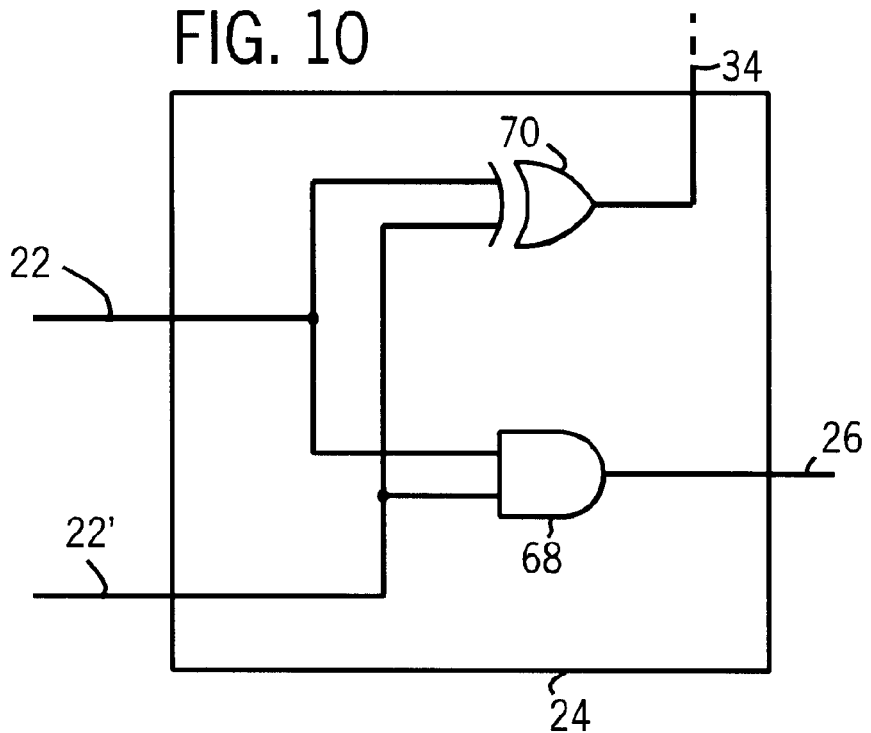
FIG. 10 is an alternative embodiment of the comparison circuit of FIG. 1 used with two field programmable gate-arrays programmed according to the methods of FIGS. 8 or 9.

Referring now to FIG. 10 in the examples of FIGS. 8 and 9 where both FPGAs have different internal structure but nevertheless produce identical rather than complementary outputs D, different comparison circuits 24' will be used in which a single AND-gate 68 receives the corresponding gate-array outputs 22 and provides a controller output 26 only if gate-array outputs 22 are both in the same state. In this case an error signal 34 is provided by an exclusive OR-gate 70 which checks for situations where corresponding gate-array outputs 22 (from FPGAs 12 and 14) have different states.

In the examples of FIGS. 10 in the event that the FPGAs have different outputs D (an error condition) the controller output 26 implicitly assumes a default value of zero or logical false.

Figure 12:
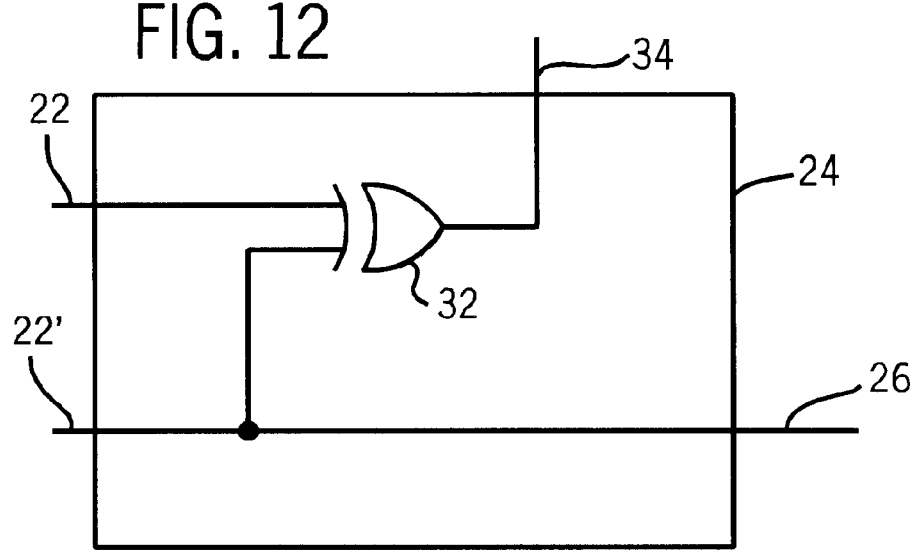
FIG. 12 is a figure similar to that of FIG. 10 showing yet another embodiment of the comparison circuit of FIG. 1 defaulting to an output of one pre-selected field programmable gate-array upon an error condition.

Referring now to FIG. 12, alternatively, the comparison circuits 24 may, upon an error condition, default to the value of one of the FPGAs (not necessarily a constant value of zero or one). In the system of FIG. 1, this may be simply implemented by connecting the gate-array outputs 22 of only one FPGA directly to the controller output 26. An error condition is still detected by gate 70.

Figure 11:
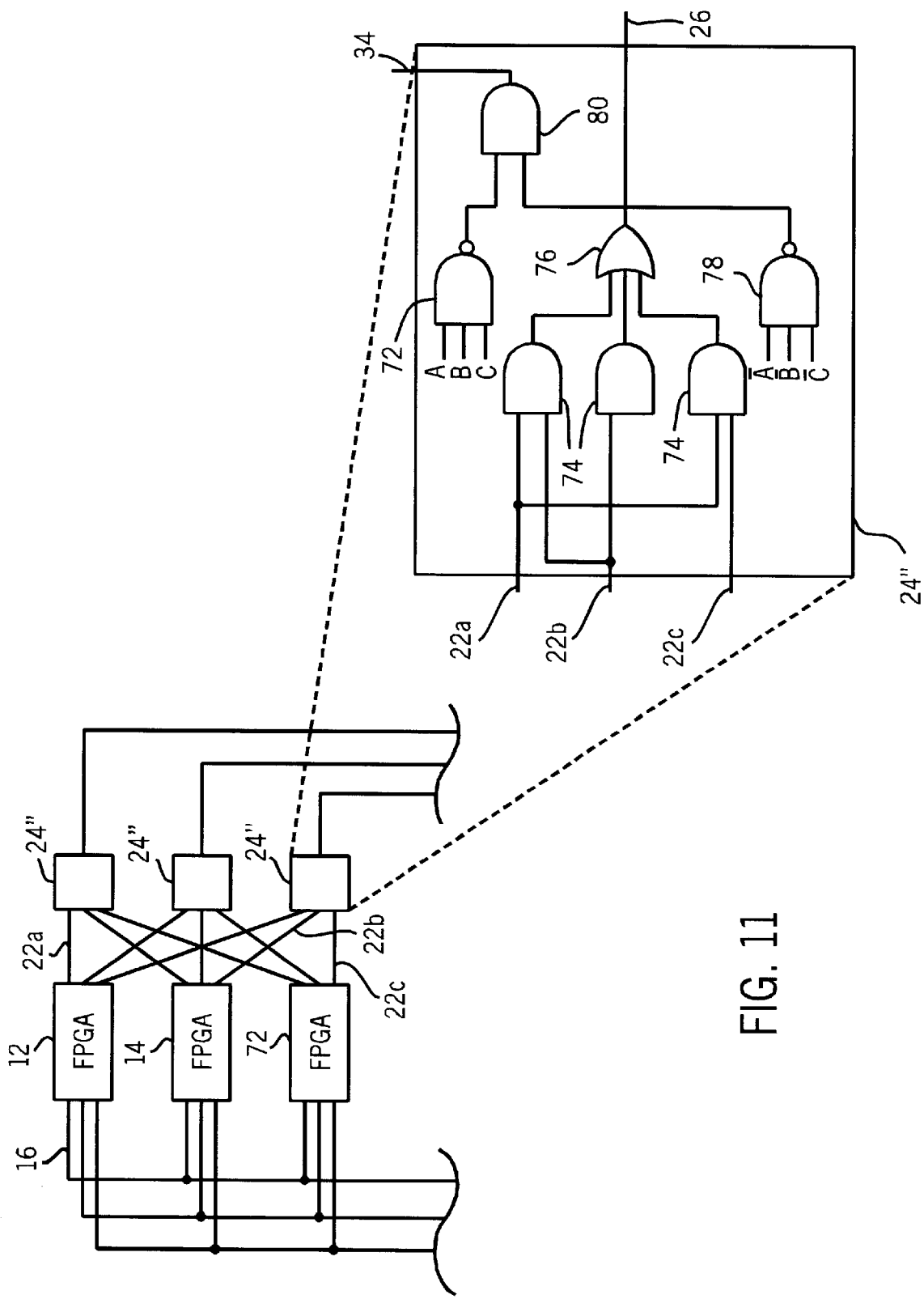
FIG. 11 is a figure similar to that of FIG. 1 showing a further embodiment of the present invention expanding the principle of the present invention to more than two field programmable gate-arrays and showing an output circuit for providing outputs with three programmable gate-arrays and a corresponding error signal.

Referring now to FIG. 11, the present invention is not limited to the use of two FPGAs 12 and 14 but may be extended to an arbitrary number N of gate-arrays. For example three FPGAs 12, 14 and 72 may be used. In this case the complementary programming scheme may be changed in favor of each FPGAs 12 providing for the same logic but with a different internal structure of interconnections per the description associated with FIGS. 8 and 9 above. The comparison circuits 24 must now perform an operation of determining the majority gate-array output value.

For the example of FIG. 11 in which each FPGAs 12 provides three gate-array outputs 22, this process of creating a single controller output 26 may employ three dual-input AND-gates 74 each of which receives a different gate-array output 22 from a corresponding triplet of gate-array outputs 22, one gate-array output coming from each of the FPGAs 12, 14 and 72 indicated as 22a, 22b, and 22c in FIG. 11. Thus the first AND-gate 74 receives as inputs gate-array output 22a and 22b, the second AND-gate 74 receives as inputs gate-array outputs 22b and 22c and the third AND-gate 74 receives as inputs gate-array outputs 22a and 22c. If any two inputs are logically true, an output value is produced by these AND-gates 74 received by a three input OR-gate 76 which provides the controller output 26. A similar system may be provided for an arbitrary number of FPGAs with an arbitrary number of outputs.

Referring still to FIG. 11, an error signal may be generated in the present invention by the use of two three input NAND-gates 72 and 78, one receiving gate-array outputs 22a, 22b and 22c and the other receiving the compliments of gate-array outputs 22a, 22b and 22c. A logically true output by both NAND gate 72 and 78 indicates an error condition as provided by AND gate 80.

Figure 13:
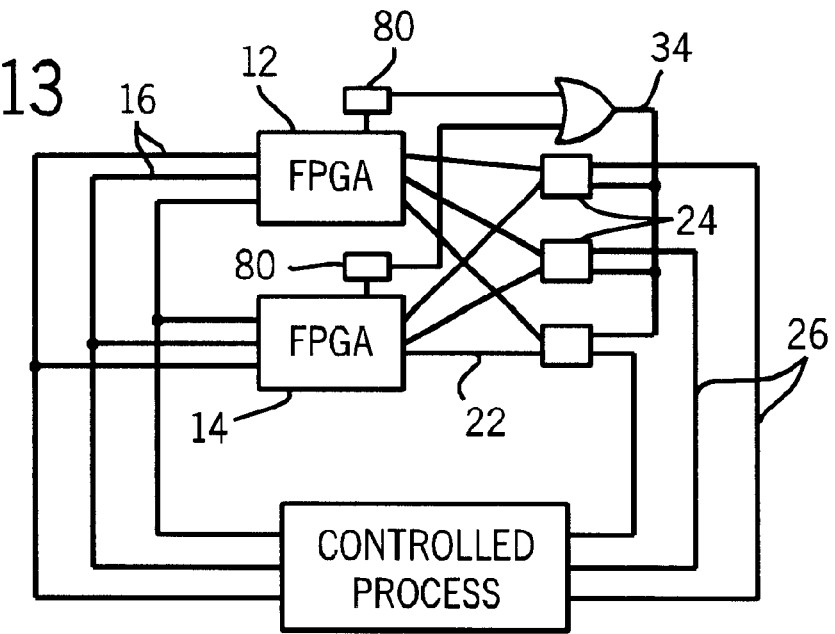
FIG. 13 is a figure similar to that of FIG. 1 showing a system providing for error determination independently of the outputs of the gate-arrays.

Referring now to FIG. 13, the detection of errors in the FPGAs 12 and 14 need not be done by comparing gate-array outputs 22 as described above, but may be done by observing the operation of the FPGAs 12 and 14 directly through error detection circuitry 80. Such error detection circuitry 80 may be internal diagnostic circuitry of the FPGA 12 and 14 such as is well known in the art, or additional programmed gates which can serve to monitor proper performance of the FPGA and to toll a watch dog timer or the like so long as proper operation is maintained. Failure to toll the watch dog timer causes an error signal even if the gate-array outputs 22 are matching. Thus, a far broader and arbitrary range of error conditions may be detected.

In the simplest case, (not shown in FIG. 13) the error signal developed independently by each error detection circuit 80 may be used to shut down the corresponding FPGA, that is to disable its gate array outputs 22 so as to not contribute to the controller output 26.

Figure 14A:
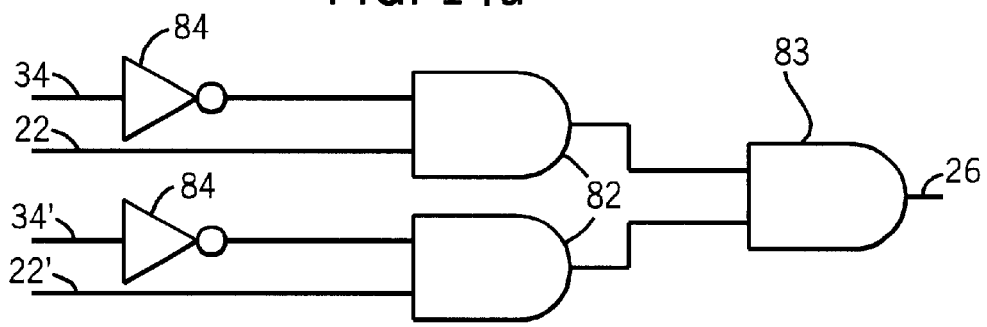
FIG. 14 is a alternative embodiment of the comparison circuit of FIG. 1 used in the system of FIG. 13.
Figure 14B:
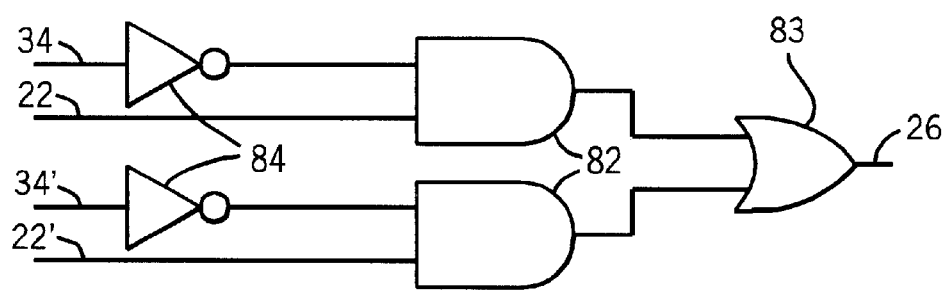

More generally, as shown in FIG. 13, however, conflicting gate-array outputs 22 may be reconciled by observing the majority outputs and using that majority for the controller outputs 26 or by defaulting to a predetermined constant value. In the case where the error is detected independently of the gate-array outputs 22, however, there is a possibility that the gate-array outputs 22 will match but both be wrong, or will differ with no clear majority or will indicate a majority and that majority will be erroneous. Referring now to FIG. 14, therefore, the error signals 34 and 34' in this case may be used to determine the controller outputs 26 per comparison circuits 24 by enabling a single output upon an error condition. As indicated in FIG. 14a and 14b, this may be accomplished by two AND gates 82. The first AND gate receives an input signal a gate-array output 22 and the inverted error signal from inverter 84 which originated from error signal 34. The second AND gate receives the same types of signals from the second gate-array an input signal a gate-array output 22' and the inverted error signal from inverter 84 which originated from error signal 34'. In FIG. 14a, the output 26 will be enabled only there are no error signals 34 or 34', therefore this circuit would energize only if both gate-arrays are operational. In FIG. 14b, the output 26 will be enabled by the gate-array outputs 22 & 22' that originate from the gate-arrays for only those gate-arrays that do not have error signals 34 & 34'. Therefore it is possible for the system to continue with an error in one of the gate-arrays.

Figure 15:
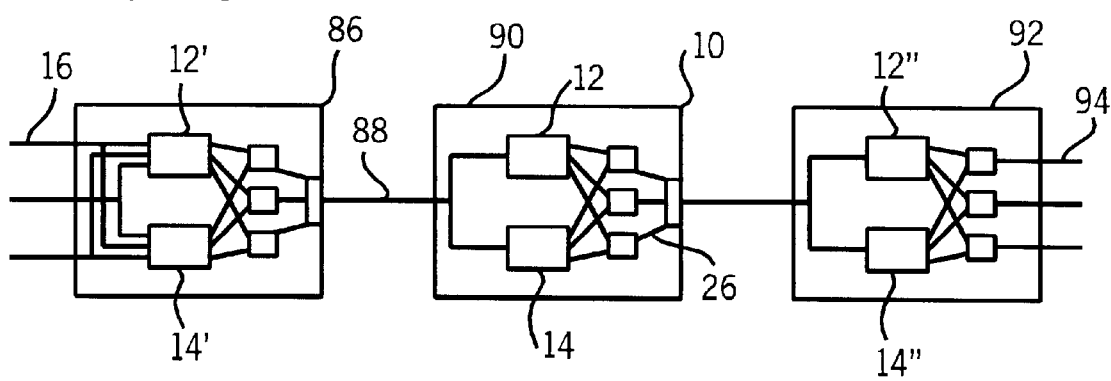

Referring now to FIG. 15, the same mechanisms described above may be used in an input block 86 of an industrial controller 10, the input block 86 which may provide for some input processing via FPGAs 12' and 14'. The input block may produce a reconciled input values when there is a conflict between the outputs of the FPGAs 12' and 14' using the mechanisms described above and an error signal both of which may be transmitted along a communications link 88. The communications link may attached to a controller 90 to provide input values to the controller 90 which may be, as described above used to produce controller outputs 26 and an error value 34 which may be also communicated to link 88. The controller outputs 26 may be in turn received by output circuit 92 having output processing FPGAs 12" and 14" for processing those output values. The output circuit 92 may provide reconciled processed controller outputs 94 using the same techniques as provided above.

The error signals developed by the present invention, either by observing discrepancies among corresponding gate array outputs 22 or by using well known circuit diagnostic techniques may be used in a several ways partially described above. The error signal may be separately reported, while allowing the control system to continue to operate, or the error signal may be used to modify the control outputs 26 or more generally to shut the control system down. There are many variations on the possible actions upon detection of error depending on the costs and safety of shutting down the control system versus allowing it to continue to operate while indicating error. Thus in one extreme, error in a single FPGA may cause shutting down on the entire system or in the other extreme non error in a single FPGA may allow its continued operation. Variations between these extremes for arbitrary numbers of FPGAs will be apparent from the above description to those of ordinary skill in the art.

The above description has been that of a preferred embodiment of the present invention, it will occur to those that practice the art that many modifications may be made without departing from the spirit and scope of the invention. For example, both or either of detection of errors by observation of the gate-array outputs or by independent error detection may be used. Combinations of the above methods of reconciling unmatched gate-array outputs may be used including those which pick as a control output a supermajority of gate-array output values but which default to a default value or a single gate-array output when a simple majority condition prevails without the necessary supermajority. In order to apprise the public of the various embodiments that may fall within the scope of the invention, the following claims are made.

I claim:

1. A high reliability industrial controller for control of an industrial process according to a control program comprising:
   (a) at least a first and second programmable gate-array having logic gates interconnected according to programmable memory cells, the programmable gate having gate-array inputs received by the interconnected logic gates to provide, for each gate-array input, a set of corresponding gate-array outputs that are Boolean functions of the inputs;
   (b) input circuitry accepting electrical inputs from the industrial process and routing the inputs to the gate-array inputs of the programmable gate-arrays;
   (c) comparison circuitry receiving gate-array outputs from the programmable gate-arrays to produce controller outputs for each given gate-array input by a comparison of the set of corresponding outputs of the given gate-arrays input; and
   (d) output circuitry receiving the controller outputs and connecting them to the industrial process;
   wherein further the programmable memory cells of the programmable gate-arrays are programmed so that different programmable gate-arrays independently execute the control program using different interconnections between logic gates.

2. The high reliability industrial controller of claim 1 wherein the different interconnections between logic gates provide that for a given set of gate-array input signals to both the first and second programmable gate-arrays, the gate-array output signals for the first programmable gate-arrays are complements of the gate-array output signals from the second programmable gate-array.

3. The high reliability industrial controller of claim 2 wherein the comparison circuitry is a set of AND-gates each receiving a gate-array output from the first programmable gate-array and an inverted gate-array output from the second programmable gate-array, the output of the AND-gates forming the controller outputs.

4. The high reliability industrial controller of claim 2 wherein the comparison circuit produces an error signal indicating that corresponding outputs of first and second programmable gate-arrays have the same values.

5. The high reliability industrial controller of claim 1 wherein the first and second gate-arrays have different architectures of logic gates and programmable memory cells.

6. The high reliability industrial controller of claim 5 wherein the different architectures of logic gates and programmable memory cells provide that for a given set of gate-array input signals to both the first and second programmable gate-arrays, the gate-array output signals for the first programmable gate-arrays are the same as the gate-array output signals from the second programmable gate-array.

7. The high reliability industrial controller of claim 6 wherein the comparison circuit produces an error signal indicating that corresponding outputs of first and second programmable gate-arrays have different values.

8. The high reliability industrial controller of claim 1 including N programmable gate-arrays, where N is an arbitrary integer greater than two, and wherein the comparison circuitry receives corresponding gate-array outputs from each of the N programmable gate-arrays to produce controller outputs by a comparison of the gate-array outputs from the N programmable gate-arrays.

9. The high reliability industrial controller of claim 8 wherein at least one of the produced controller outputs matches a majority of the corresponding gate-array outputs.

10. The high reliability industrial controller of claim 8 wherein at least one of the produced gate-array outputs matches the output of a pre-selected gate-array.

11. The high reliability industrial controller of claim 8 wherein at least one of the produced gate-array outputs is a pre-selected default value.

12. The high reliability industrial controller of claim 8 wherein the comparison circuit produces an error output indicating whether there is a lack of matching among the corresponding gate-array outputs of the N programmable gate-arrays.

13. The high reliability industrial controller of claim 1 including a first and second compiler processing the control program to program the programmable memory cells of the first and second programmable gate-arrays, respectively, wherein the first and second compilers are different.

14. A high reliability industrial controller for control of an industrial process according to a control program comprising:
   (a) at least a first and second programmable gate-array having logic gates interconnected according to programmable memory cells, the programmable gate having gate-array inputs received by the interconnected logic gates to provide for each gate-array input a set of corresponding gate-array outputs that are Boolean functions of the gate-array input;
   (b) input circuitry accepting electrical inputs from the industrial process and routing the inputs to the gate-array inputs of both the first and second programmable gate-arrays;
   (c) diagnostic circuitry monitoring the operation of the programmable gate-arrays to produce an error signal upon failure of operation of at least one programmable gate-arrays;
   (d) output modification circuitry receiving gate-array outputs from the programmable gate-arrays and receiving the error signal from the diagnostic circuitry to produce controller outputs based on at least one of the set of corresponding outputs of the first and second programmable gate-arrays and the error signal;
   (e) output circuitry receiving the controller outputs and connecting them to the industrial process;
   wherein further the programmable memory cells of the first and second programmable gate-arrays are programmed to each independently execute the control program using different interconnections between logic gates.

15. The high reliability industrial controller of claim 14 wherein the first and second gate-arrays have different architectures of logic gates and programmable memory cells.

16. The high reliability industrial controller of claim 14 wherein upon receipt of the error signal the output modification circuitry produces controller outputs for each given set of corresponding gate-array outputs matching a majority of the set of corresponding gate-array outputs.

17. The high reliability industrial controller of claim 14 wherein upon receipt of the error signal the output modification circuitry produces controller outputs for each given set of corresponding gate-array outputs matching a pre-selected one of the set of corresponding gate-array outputs.

18. The high reliability industrial controller of claim 14 wherein upon receipt of the error signal the output modification circuitry produces controller outputs for only the given corresponding gate-array outputs where the corresponding gate arrays do not contain a detected error.

19. The high reliability industrial controller of claim 14 wherein upon receipt of the error signal the output modification circuitry produces controller outputs for each given set of corresponding gate-array outputs matching a default state value.

20. The high reliability industrial controller of claim 14 including N programmable gate-arrays, where N is an arbitrary integer, and wherein for each gate-array input, the output circuitry receives a set of corresponding gate-array outputs from each of the N programmable gate-arrays to produce controller outputs based on the set of corresponding gate-array inputs.

21. The high reliability industrial controller of claim 14 including a first and second compiler processing the control program to program the programmable memory cells of the first and second programmable gate-arrays, respectively, wherein the first and second compilers are different.

\* \* \* \* \*